(12) United States Patent
Luck, Jr. et al.

(10) Patent No.: US 9,049,253 B2
(45) Date of Patent: Jun. 2, 2015

(54) RESETTING / RESTARTING SIP ENDPOINT DEVICES

(75) Inventors: Carleton M. Luck, Jr., Apex, NC (US); Pandit Panburana, Cary, NC (US); Craig Paul Miller, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1531 days.

(21) Appl. No.: 11/501,538

(22) Filed: Aug. 9, 2006

(65) Prior Publication Data

US 2008/0062962 A1 Mar. 13, 2008

(51) Int. Cl.
*H04L 12/66* (2006.01)
*H04L 29/08* (2006.01)
*H04L 29/06* (2006.01)

(52) U.S. Cl.
CPC .............. *H04L 67/34* (2013.01); *H04L 65/1016* (2013.01); *H04L 65/1069* (2013.01); *H04L 63/12* (2013.01); *H04L 63/08* (2013.01); *H04L 29/06027* (2013.01); *H04L 65/1006* (2013.01)

(58) Field of Classification Search
CPC ............ H04L 65/1006; H04L 65/1016; H04L 65/1069; H04L 65/1073; H04L 65/1083; H04L 67/24; H04L 65/1063; H04L 67/306; H04L 29/06197; H04L 61/3085; H04L 65/105; H04M 7/006; H04W 12/06; H04W 4/00; H04W 4/16; H04W 36/0055
USPC .................................................. 370/352–356
See application file for complete search history.

(56) References Cited

U.S. PATENT DOCUMENTS

| | | | |
|---|---|---|---|
| 2003/0088421 A1 | 5/2003 | Maes et al. | |
| 2003/0156579 A1* | 8/2003 | Cho | 370/352 |
| 2004/0047301 A1* | 3/2004 | Poikselka et al. | 370/261 |
| 2004/0103282 A1 | 5/2004 | Meier et al. | |
| 2004/0176091 A1 | 9/2004 | Bajko et al. | |
| 2004/0205192 A1* | 10/2004 | Olson et al. | 709/227 |
| 2004/0205209 A1 | 10/2004 | Wengrovitz et al. | |
| 2004/0255302 A1 | 12/2004 | Trossen | |
| 2005/0117591 A1* | 6/2005 | Hurtta et al. | 370/401 |
| 2005/0136926 A1* | 6/2005 | Tammi et al. | 455/435.1 |
| 2006/0030320 A1* | 2/2006 | Tammi et al. | 455/435.2 |
| 2006/0133356 A1* | 6/2006 | Suzukawa | 370/352 |
| 2006/0149847 A1* | 7/2006 | Meskauskas et al. | 709/229 |
| 2006/0182255 A1* | 8/2006 | Luck et al. | 379/220.01 |

(Continued)

FOREIGN PATENT DOCUMENTS

EP 0 669 072 B1 1/2003

OTHER PUBLICATIONS

China Patent Office Action; Patent Application No. 2007-80029601.3; dtd Mar. 21, 2012; 7 pages including translation.

(Continued)

*Primary Examiner* — Asad Nawaz
*Assistant Examiner* — Najeebuddin Ansari
(74) *Attorney, Agent, or Firm* — Baker Botts L.L.P.

(57) ABSTRACT

In one embodiment, a Session Initiation Protocol (SIP) endpoint device unregisters all lines from a call manager component. This is followed by a power-on reset. A server is then accessed to read a configuration file of the SIP endpoint device. Finally, the SIP endpoint device re-registers all lines with the call manager component. It is emphasized that this abstract is provided to comply with the rules requiring an abstract that will allow a searcher or other reader to quickly ascertain the subject matter of the technical disclosure.

13 Claims, 5 Drawing Sheets

(56) References Cited

U.S. PATENT DOCUMENTS

| | | | |
|---|---|---|---|
| 2007/0008893 A1* | 1/2007 | Singh et al. | 370/241 |
| 2007/0008957 A1* | 1/2007 | Huang | 370/352 |
| 2007/0043876 A1* | 2/2007 | Varga et al. | 709/245 |
| 2007/0104182 A1* | 5/2007 | Gorti et al. | 370/352 |
| 2007/0223446 A1* | 9/2007 | McMenamy et al. | 370/351 |

OTHER PUBLICATIONS

European Patent Office Action—Munich, Germany, Application No. 07796646.3-1853 / 2050006, PCT/US2007015356, Ref: P33133EP-PCT; Communication re: extended EU search report; dated Apr. 4, 2014.

European Patent Office Action—Munich, Germany, Application No. 07796646.3-1853 / 2050006, PCT/US2007015356, Ref: P33133EP-PCT; Communication re: supplementary EU search report; dated Apr. 24, 2014.

J. Rosenberg et al., "SIP: Session Initiation Protocol", 20020601; 20020600, The Internet Society, Jun. 1, 2002, pp. 1-269, XP015009039.

H. Sinnreich et al., "SIP Telephony Device Requirements and Configuration; rfc4504.txt", 20060501, May 1, 2006, XP015046293, ISSN: 0000-0003 (37 pgs).

D. Petrie, Pingtel Corp., "A Framework for SIP User Agent Profile Delivery; draft-ietf-sipping-config-framework-02.txt", vol. sipping, No. 2, Feb. 14, 2004, XP015027876, ISSN: 0000-0004 (23 pgs).

\* cited by examiner

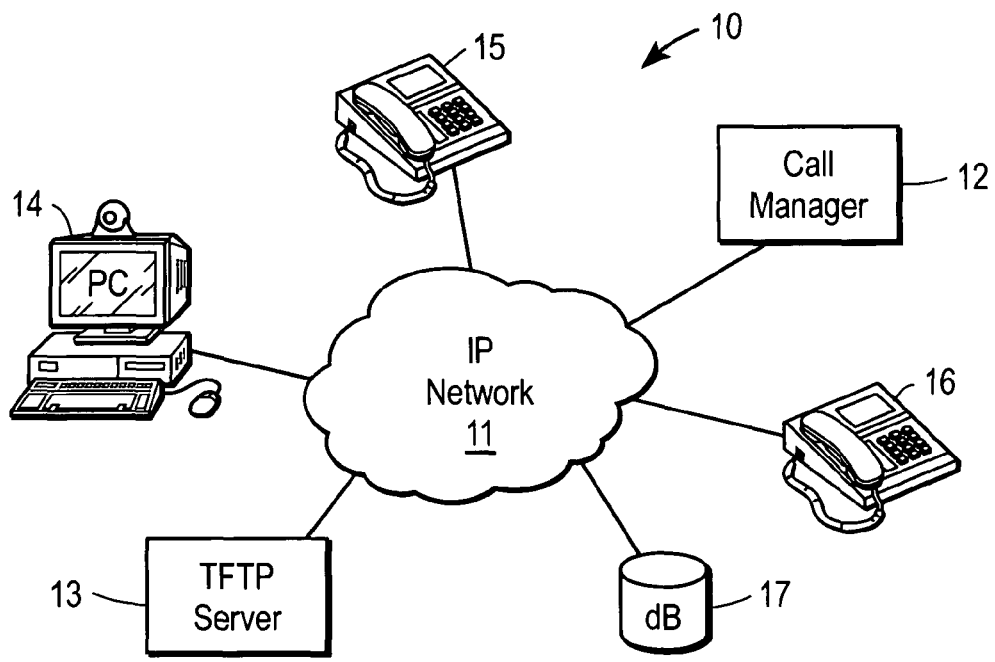

FIG. 1

NOTIFY sip: *lineX_name@ipaddress*:5060 SIP/2.0
Via: SIP/2.0/UDP *ipaddress*:5060;branch-1
Via: SIP/2.0/UDP *ipaddress*
From: <sip:webadmin@*ipaddress*>
To: <sip:*lineX_name@ipaddress*>
Event: service-control
Date: Mon, 10 Jul 2000 16:28:53 - 0700
Call-ID: 1349882@*ipaddress*
CSeq: 1300 NOTIFY
Contact: <sip:webadmin@*ipaddress*>
Content-Length: xyz action = [reset   restart   check-version   call-preservation]
RegisterCallId= {<callid from register msg>}
ConfigVersionStamp = {79829A69-9489-4C8E-8143-90A9C22DFAD7}
DialplanVersionStamp = {79829A69-9489-4C8E-8143-90A9C22DFAD7}
SoftkeyVersionStamp = {79829A69-9489-4C8E-8143-90A9C22DFAD7}

FIG. 2

RESETTING / RESTARTING SIP ENDPOINT DEVICES

FIELD OF THE INVENTION

The present invention relates generally to the field of telecommunications; more specifically, to methods and apparatus for voice and data communications with Internet Protocol (IP) endpoint devices.

BACKGROUND OF THE INVENTION

Many VoIP phones today support the Session Initiation Protocol (SIP), which is a standard used in setting up and tearing down voice or video calls transmitted over packet-based networks. SIP is a peer-to-peer protocol in which all voice/video communications between the caller and callee are performed using the Real-time Transport Protocol (RTP). Resetting or restarting of VoIP phones is typically achieved by the call management agent (e.g., CallManager) sending unsolicited call control messages to the client phone to trigger the reset/restart. These messages cause the phone to reboot, re-read its configuration files and re-register with the CallManager. (The term "reset" commonly refers to a long power-on cycle, whereas "restart" normally refers to quicker re-initialization of the configuration and protocol stack. The term "warm restart" denotes a sequence of re-initialization operations that is performed to reset a previously running system or device.)

One problem that exists is that legacy low-end and mid-range SIP phones can be reset, but they implement different mechanisms that are incompatible with recently developed call management architectures. Still another problem with prior art approaches is that they are vulnerable to malicious attacks wherein an unscrupulous hacker can indiscriminately send out reset/restart messages to a huge number of IP phones.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 1 is a high-level diagram of a communications network in accordance with one embodiment of the present invention.

FIG. 2 illustrates a definition of the body of an unsolicited NOTIFY message in accordance with one embodiment of the present invention.

DETAILED DESCRIPTION OF EXAMPLE EMBODIMENTS

Figure 3:
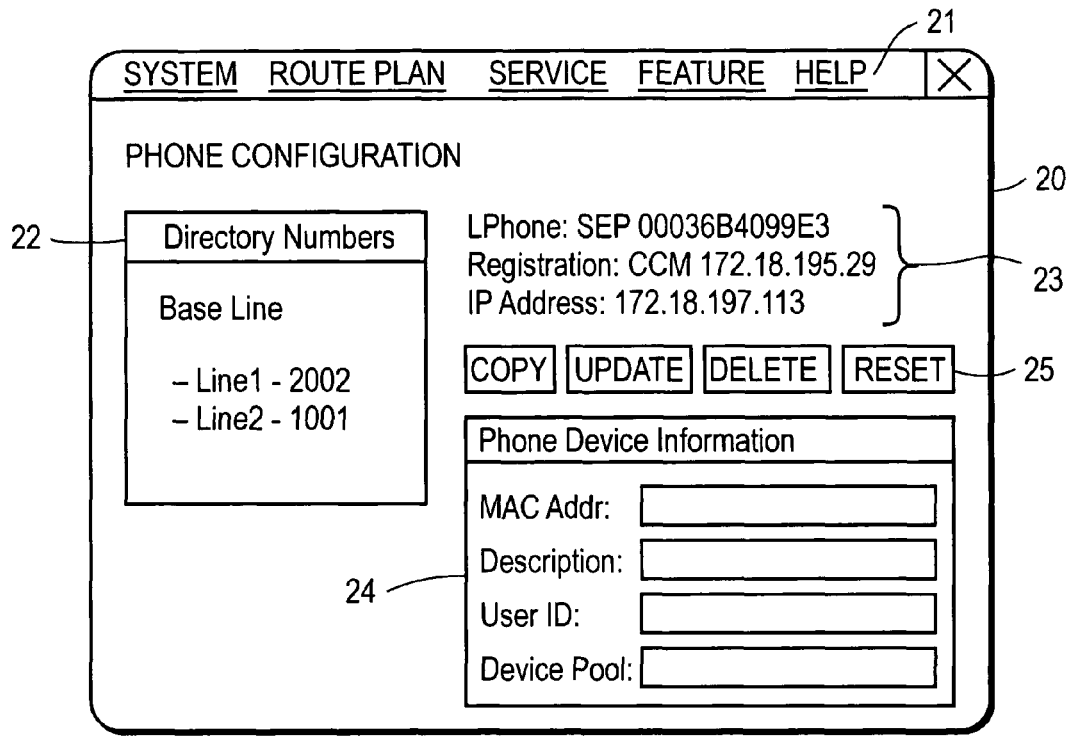
FIG. 3 is an example graphical user interface utilized in conjunction with one embodiment of the present invention.

In the following description specific details are set forth, such as device types, system configurations, authentication methods, etc., in order to provide a thorough understanding of the present invention. However, persons having ordinary skill in the arts will appreciate that these specific details may not be needed to practice the present invention.

Referring to FIG. 1, there is shown an example communications network 10 with endpoint devices 14-16 connected with an IP network 11. In this example, each of the endpoint devices is SIP compatible. The endpoint devices are shown comprising a personal computer (PC) 14 with softphone capabilities for placing/receiving calls, and IP phones 15 & 16. Each of endpoint devices 14-16 includes a processor and executable code that supports the protocol enhancements and functionality described below Other endpoint devices not specifically shown in FIG. 1 that may be used to initiate or participate in a call or receive call control messages from an administrator or call management entity include a personal digital assistant (PDA), a laptop or notebook computer, or any other device, component, element, or object capable of initiating or participating in voice, video, or packet-data exchanges with communications system 10 in accordance with the protocols described herein.

Communications network 10 is also shown including a call manager processing component (e.g., a server) 12, a Trivial File Transfer Protocol (TFTP) component (e.g., server) 13, and a database 17, the latter of which may be used to store configuration files and other information associated with each of the SIP endpoint devices 14-16. Typically, database 17 is associated with or incorporated in TFTP server 13, although in certain embodiments database 17 may comprise a separate (stand-alone) component. Call manager 12 may comprise a processing component such as such as Cisco's CallManager system with appropriate software/firmware modules, plug-ins, or enhancements for implementing the functions described herein. Call manager 12 includes an interface used for communications with endpoint devices 14-16 involving the SIP service-control event package discussed below. Similarly, TFTP server 13 includes an interface for communication configuration file information with the respective endpoint devices. It should be understood that communication network 10 may also include additional (i.e., secondary) call manager and TFTP components with respective interfaces used for transmitting the SIP service-control event package and for reading the configuration file information.

Alternative embodiments of the present invention may be also implemented in software or hardware (firmware) installed in other types of IP communication systems, PBX, telephony, telephone, and other telecommunications systems. Similarly, the signaling path utilized for transmission of commands, messages, and signals for establishing, moderating, managing and controlling calls between endpoint devices (e.g., SIP phones 15 & 16) may be across any network resources.

According to one embodiment of the present invention, a mechanism is provided that modifies a SIP unsolicited NOTIFY message with a specifically-defined message body that may be utilized to communicate reset, restart, version stamp, and call preservation information from a call agent to a SIP endpoint device, e.g., a SIP phone. In a particular implementation, a single new event type, i.e., "service-control", is defined to signal a SIP endpoint device to use the Cisco CallManager-specific reset/restart mechanism. As such, the modified unsolicited NOTIFY message applies to legacy as well as next-generation SIP phones, and satisfies the requirements of Cisco's CallManager call processing product. In addition, the mechanism may be enabled when the endpoint device is operating in a CallManager environment. In a non-CallManager environment, the existing mechanisms for each platform may be enabled for interoperability with existing administrative systems.

FIG. 2 is an example listing of a SIP NOTIFY message with the service-control event type header according to one embodiment of the present invention. Practitioners in the art will appreciate that the combination of the "From", "To", and "Call-ID" headers identifies the call leg. The "Event" header specifies the event type being signaled, i.e., service-control. The "Content-Length" header indicates the number of octets in the message body. It is appreciated that other types of headers (not specifically shown) may also be included in the message. The specifically-defined message body indicating what action to take is shown in the example of FIG. 2 directly below the "Content-Length" header, i.e., beginning with the line that reads, "action= . . . ". Each of the various operations that may be specified in the action field will be discussed in detail below.

The service-control event package defines content that, in one embodiment, is used to perform certain specific actions (i.e., reset, restart, check-version, and call-preservation) on a SIP user agent or endpoint (e.g., phone). The body of the NOTIFY message contains the specific operation that the call agent wishes to invoke on the SIP phone. The operation is specified in the action field.

Figure 5:
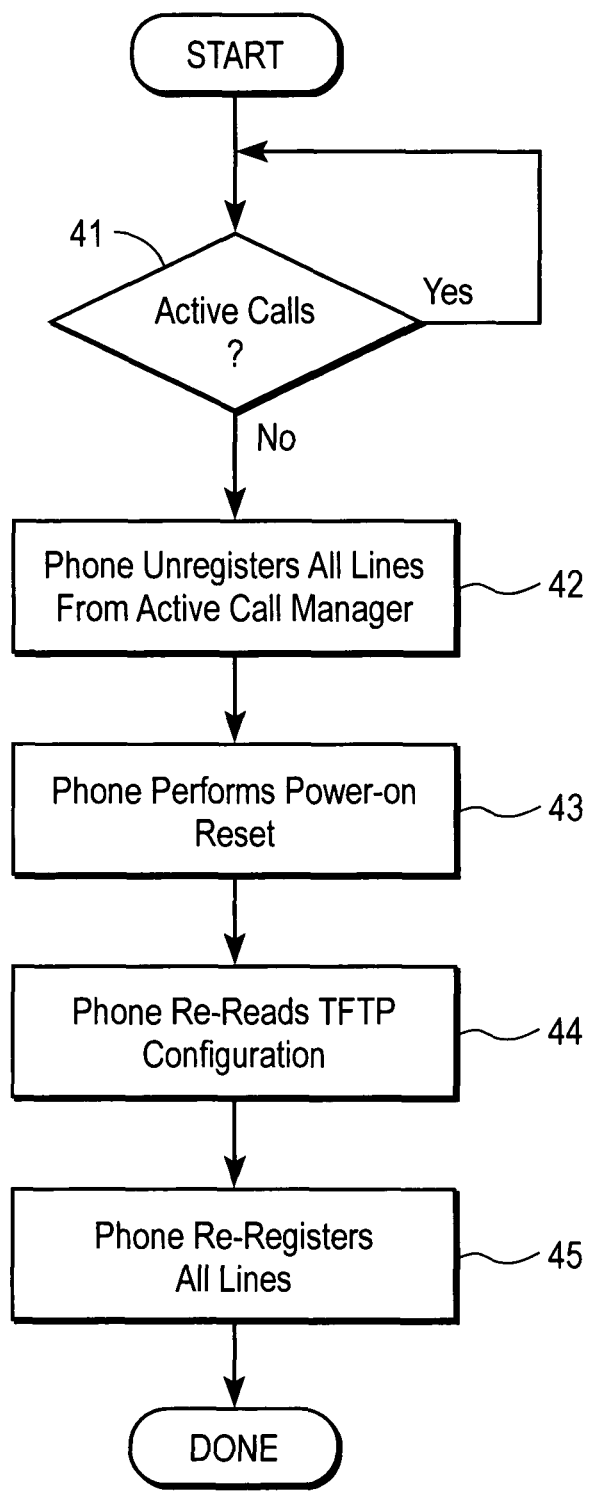
FIG. 5 is a flowchart diagram that illustrates a method of operation according to one embodiment of the present invention.

By way of example, FIG. 5 is a flowchart diagram list the steps performed in a reset operation in accordance with one embodiment of the present invention. When a call manager agent or administrator sends a NOTIFY message that contains a reset action, the SIP phone responds by first checking whether there are any current active calls in process (block 41). If so, the phone waits until all lines are idle (i.e., no active calls). When there are no active calls, the SIP phone first unregisters all lines from the active call manager or call agent (REGISTER w/Expires: 0), which step is shown by block 42. Next, the phone performs a power-on reset operation (block 43). As part of the power-on reset cycle, the SIP phone re-reads its TFTP configuration files (block 44). This latter step may be performed by accessing the TFTP server or other database containing this information. The final step in the reset process occurs when the phone reregisters all of its lines (block 45).

In one implementation, when a phone first registers with the call manager, it sends a unique call identifier (ID) to the call manager component. Thereafter, each time the call manager sends a reset/restart message to the phone it includes the Call-ID received in the last REGISTER message from the phone in the body of the NOTIFY message. The phone verifies that the call ID matches the call ID sent in the REGISTER message prior to taking action. Practitioners in the art will appreciate that this step effectively acts as an authentication mechanism that guards against malicious attacks, since the call ID changes each time the phone reregisters with the call manager component. In other words, the call ID mechanism prevents a malicious attacker from using a single message to reset multiple phones since each message has to be individually created with the correct call ID in order to perform a reset/restart of a particular SIP phone.

Figure 6:
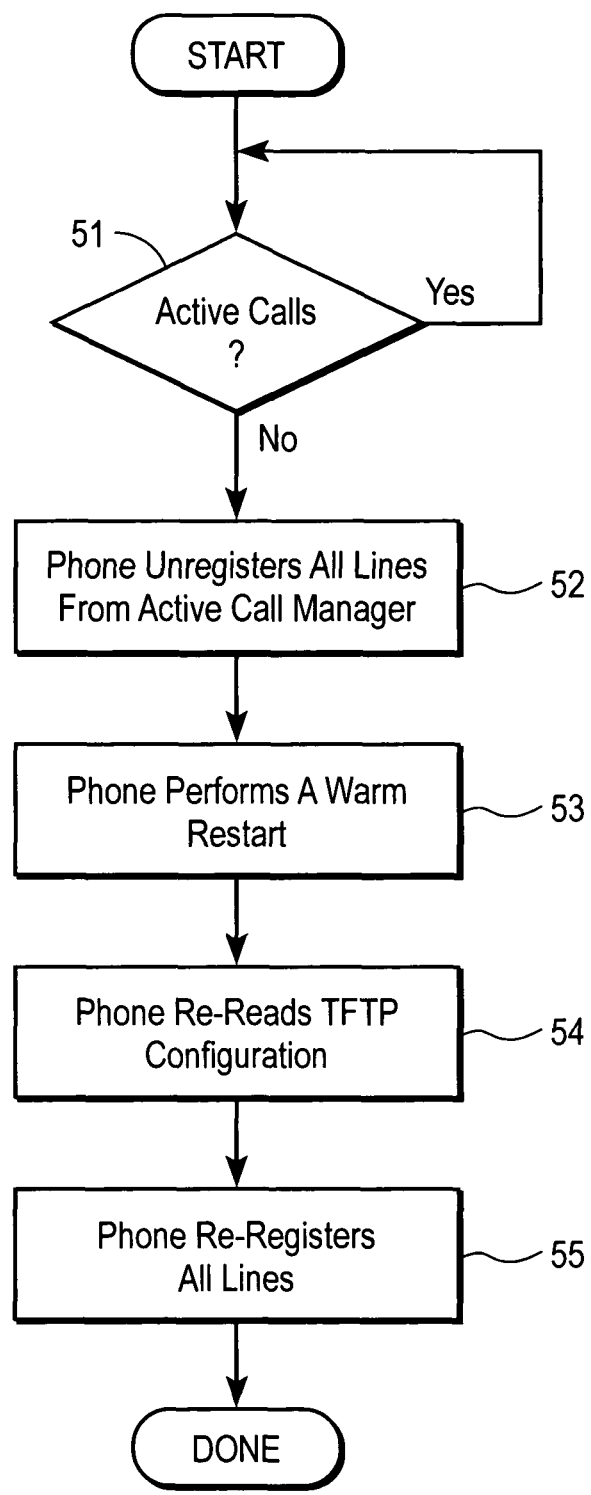
FIG. 6 is a flowchart diagram that illustrates another method of operation according to one embodiment of the present invention.

FIG. 6 is a flowchart diagram that illustrates a restart operation according to one embodiment of the present invention. Similar to the reset operation shown in FIG. 5, the restart operation begins with the phone waiting until all lines are idle; that is, the phone has no active calls (block 51). Once all of the lines are idle, the phone unregisters all of its lines from the active call manager/call agent (REGISTER w/Expires: 0), as shown in block 52. At this point in the process the phone performs a warm restart, followed by a re-reading of its configuration file information, e.g., from the TFTP server (block 53). After the phone has re-read its TFTP configuration files it reregisters all of its phone lines (block 54).

Figure 7:
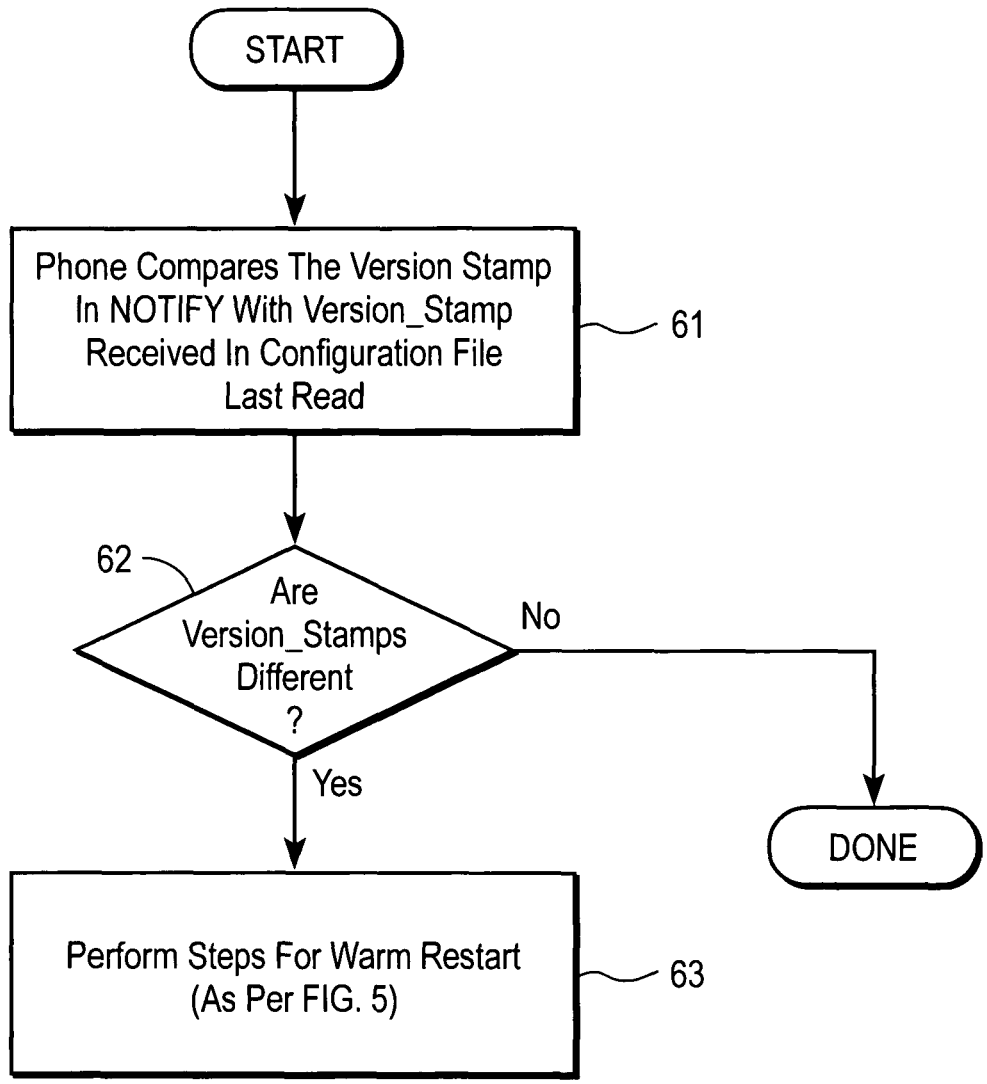
FIG. 7 is a flowchart diagram that illustrates yet another method of operation according to one embodiment of the present invention.

FIG. 7 illustrates the "check-version" action according to one embodiment of the present invention. The check-version action is used to verify that the configuration of the phone is synchronous with the configuration information stored in the call manager and/or TFTP server components. It is appreciated that different phone types may have different configuration version stamps that denote the version of the phone configuration file. In one embodiment, the call manager may communicate with the phone via a NOTIFY message and includes the current version stamp information for that particular phone. To implement this feature of the present invention a version stamp field is added to each of the configuration files. This version stamp is saved/stored by the phone each time the configuration file is read (or re-read) from the TFTP server.

By way of further example, when the phone receives the NOTIFY message with the action=check-version it responds by comparing the received version stamp from the call manager against the version stamp information it has stored internally (e.g., in a non-volatile memory). The internally-stored version stamp represents the version stamp received in the configuration file last read (block 61). If the comparison of the two version stamps (block 62) results in a match, the process is over. On the other hand, if the two version stamps are different, the phone may perform the steps described above in FIG. 5 for a restart (warm), which includes re-reading its configuration file information from the TFTP server (block 63). This ensures that the configuration file information last downloaded by the phone is identical with the current information in both the call manager and TFTP server components.

The call-preservation action is used to indicate that the signaling path i.e., between the caller and callee, is broken. Note that this assumes that the signaling path between the phone and the call manager component is still intact. In response to a call-preservation action specified in a NOTIFY message, a SIP phone or endpoint device responds by disabling all features softkeys (e.g., hold, resume, transfer, conference, etc.), thereby only allowing the user to end the call. The phone may also optionally display a temporary fail message.

Referring now to FIG. 3, a graphical user interface (GUI) window 20 is shown that allows a user or administrator working from a PC to configure a SIP phone and/or initiate a reset/restart operation in accordance with one embodiment of the present invention. The GUI may be generated by software (i.e., code) running the user's PC. In other cases, the GUI may comprise a collaborative web-based application that is accessed by the browser software running on the user's PC. For instance, the GUI may reside on a server running Call Manager 12 in FIG. 1, with the GUI being accessed by PC 14 via network 11 In other instances, GUI may comprise a downloaded application, or other forms of computer-executable code that may be loaded or accessed by PC 14.

In the embodiment shown in FIG. 3, window 20 includes a command toolbar 21 as well as various fields that include an directory number field 22, an identification information field 23 containing phone ID, registration, and IP address information, and a phone device configuration information field 24 with data entry fields for items such as MAC address, description, user ID, and device pool information. (It is appreciated that each of the fields shown may include additional information not specifically illustrated in the figure.) Also included is a set of command icons or buttons including a "RESET" button 25. For example, after modifying configuration file information in any of the various data entry fields of device configuration information field 24, a user may press button 25 to apply to the new device configuration information to the phone. That is, a user or administrator can cause the new configuration information to be downloaded to the phone simply by initiating a reset or restart. In other words, resetting or restarting a phone causes that phone to re-read its configuration file information, thereby causing any configuration changes to be applied to that phone.

It is appreciated that although FIG. 3 shows a single phone configuration window or page, the GUI may include multiple pages. Pages which contain phone configuration may include a RESET button (i.e., button 25) so that when the user or administrator changes a phone configuration item, the change can be automatically applied (downloaded) to that phone.

Figure 4:
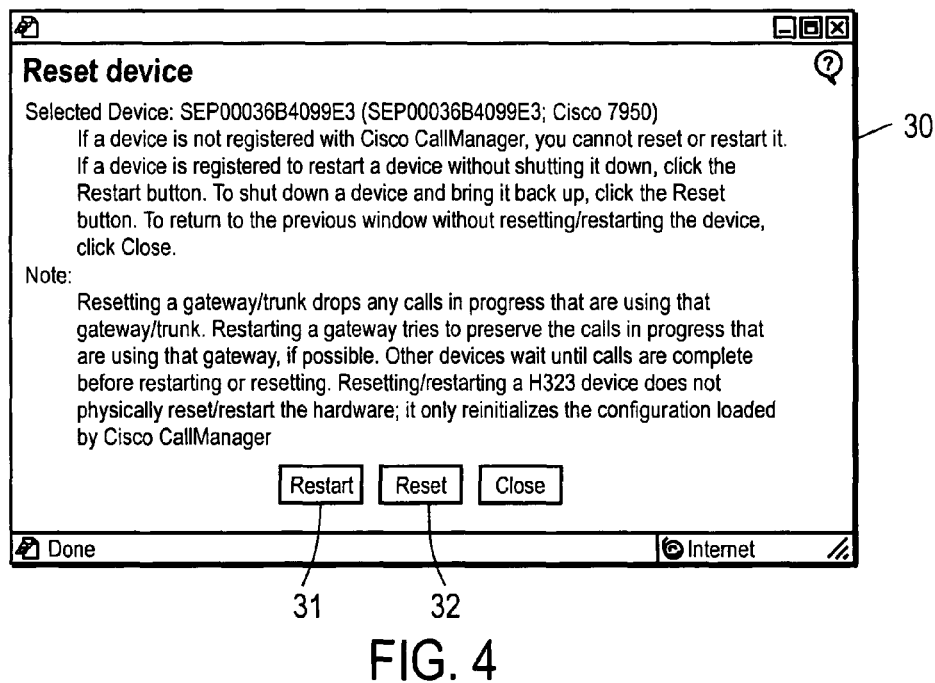
FIG. 4 illustrates another user interface window utilized to reset/restart an endpoint device in accordance with one embodiment of the present invention.

FIG. 4 shows a pop-up window 30 that appears on a PC in response to pressing of button 25 in accordance with one embodiment of the present invention. As can be seen, window 30 includes information regarding the selected device, including the endpoint device's identification number, as well as instructions and notes informing the user or administrator of the consequences of restarting or resetting of the endpoint device. After reading the information contained in pop-up window 30, the user can choose to either reset (by pressing button 32) or restart (by pressing button 31) the phone device in accordance with the descriptions accompanying FIGS. 5 and 6, respectively.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. For example, in addition to sending a call ID to the Call Manager every time the phone registers with the Call Manager, the phone may also periodically send a refresh message that contains its call ID to the call manager. Additionally, the number and type of actions described herein is not intended to be exclusive; that is, additional actions may be defined in the body of the modified SIP NOTIFY message of the present invention. Accordingly, the specification and drawings are to be regarded in an illustrative rather than a restrictive sense.

We claim:

1. A processor-implemented method of operation for a Session Initiation Protocol (SIP) endpoint device comprising:
    receiving, by the SIP endpoint device, an unsolicited NOTIFY message from a call manager component, the unsolicited NOTIFY message having a specific event header that signals the SIP endpoint device to utilize a reset/restart mechanism specific to the call manager component, a body of the SIP NOTIFY message communicating one of a plurality of actions to be taken by the SIP endpoint device, the plurality of actions including a reset operation and/or a restart operation; and
    wherein the reset operation specified in the body of the SIP NOTIFY message cause the SIP endpoint device to:
    after waiting until all active calls on the SIP endpoint device have ended, unregistering all lines of the SIP endpoint device from the call manager component;
    performing a power-on reset of the SIP endpoint device;
    accessing a server to read a configuration file of the SIP endpoint device;
    re-registering all the lines of the SIP endpoint device with the call manager component;
    receiving a call ID from the call manager component; and
    verifying that the call ID received matches a unique call ID sent to the call manager component in a last registering transmission.

2. The processor-implemented method of claim 1 wherein the SIP endpoint device comprises an Internet protocol telephone device.

3. The processor-implemented method of claim 1 wherein the unsolicited NOTIFY message includes version stamp information that causes the SIP endpoint device to compare a version stamp received in the unsolicited NOTIFY message against a stored version stamp.

4. A processor-implemented method of operation for a Session Initiation Protocol (SIP) endpoint device comprising:
    receiving, by the SIP endpoint device, an unsolicited NOTIFY message from a call manager component, the unsolicited NOTIFY message including a specific event header that signals the SIP endpoint device to utilize a reset/restart mechanism specific to the call manager component, a body of the SIP NOTIFY message communicating one of a plurality of actions to be taken by the SIP endpoint device, the plurality of actions including a reset operation and/or a restart operation; and
    wherein the reset operation specified in the body of the SIP NOTIFY message causes, by the SIP endpoint device:
    after waiting until all active calls on the SIP endpoint device have ended, unregistering all lines of the SIP endpoint device from a call manager component;
    performing a power-on reset of the SIP endpoint device;
    accessing a server to read a configuration file of the SIP endpoint device;
    re-registering all the lines of the SIP endpoint device with the call manager component;
    receiving a call ID from the call manager component; and
    verifying that the call ID received matches a unique call ID sent to the call manager component in a last registering transmission.

5. The processor-implemented method of claim 4 wherein the unsolicited NOTIFY message comprises a specific event header.

6. The processor-implemented method of claim 4 wherein the unsolicited NOTIFY message includes version stamp information that causes the SIP endpoint device to compare a version stamp received in the unsolicited NOTIFY message against a stored version stamp downloaded to the SIP endpoint device during a last configuration file read.

7. A non-transitory computer-readable storage medium encoded with a computer program, which when executed, is operable to:
    responsive to receiving an unsolicited NOTIFY message from a call manager component, implement a reset operation, the unsolicited NOTIFY message having a specific event header that signals the SIP endpoint device to utilize a reset/restart mechanism specific to the call manager component, a body of the SIP NOTIFY message communicating one of a plurality of actions to be taken by the SIP endpoint device, the plurality of actions including the reset operation and/or a restart operation, wherein the reset operation specified in the body of the SIP NOTIFY message cause the SIP endpoint device to:
after waiting until all active calls on a Session Initiation Protocol (SIP) endpoint device have ended, unregister all lines of the SIP endpoint device from the call manager component;
perform a power-on reset of the SIP endpoint device;
access a server to read a configuration file of the SIP endpoint device;
re-register the lines of the SIP endpoint device with the call manager component;
receive a call ID from the call manager component;
verify that the call ID received matches a unique call ID sent to the call manager component in a last registering transmission.

8. The non-transitory computer-readable storage medium of claim 7 further operable to before unregistering all the lines, wait until all active calls on the SIP endpoint device have ended.

9. A non-transitory computer-readable storage medium encoded with a computer program, which when executed, is operable to:
responsive to receiving an unsolicited NOTIFY message from a call manager component, implement a reset operation, the unsolicited NOTIFY message having a specific event header that signals the SIP endpoint device to utilize a reset/restart mechanism specific to the call manager component, a body of the SIP NOTIFY message communicating one of a plurality of actions to be taken by the SIP endpoint device, the plurality of actions including the reset operation and/or a restart operation, wherein the reset operation specified in the body of the SIP NOTIFY message cause the SIP endpoint device to:
after waiting until all active calls on a Session Initiation Protocol (SIP) endpoint device have ended, unregister all lines of the SIP endpoint device from the call manager component;
perform a power-on reset of the SIP endpoint device;
access a server to read a configuration file of the SIP endpoint device;
re-register the lines of the SIP endpoint device with the call manager component;
receive a call ID from the call manager component; and
verify that the call ID received matches a unique call ID sent to the call manager component in a last registering transmission.

10. The non-transitory computer-readable storage medium of claim 9 wherein the operation of unregistering all lines is responsive to a NOTIFY message having a specific event header.

11. The non-transitory computer-readable storage medium of claim 9 further operable to before unregistering all the lines, wait until all active calls on the SIP endpoint device have ended.

12. An apparatus comprising:
a display;
a program that runs on a computer to produce a graphical user interface on the display, the graphical user interface allowing a person to modify a configuration file of an Internet Protocol (IP) phone device and to reset or restart the IP phone device, the graphical user interface generating output signals in response to either a reset or restart command input;
an interface for transmitting the output signals to a call manager component, the output signals causing the call manager component to send a Session Initiation Protocol (SIP) NOTIFY message to the IP phone device, the SIP NOTIFY message having a specific event header that signals the IP phone device to utilize a reset/restart mechanism specific to the call manager component, a body of the SIP NOTIFY message communicating one of a plurality of actions to be taken by the IP phone device, the plurality of actions including a reset operation and/or a restart operation; and
wherein the reset operation specified in the body of the SIP NOTIFY message causes the IP phone device to:
after waiting until all active calls on the IP phone device have ended, unregister all lines of the IP phone device from the call manager component;
perform a power-on reset of the IP phone device;
access a server to read the configuration file of the IP phone device;
re-register the lines of the IP phone device with the call manager component;
receive a call ID from the call manager component; and
verify that the call ID received matches a unique call ID sent to the call manager component in a last registering transmission.

13. An apparatus comprising:
a server coupled with a communications network;
code that runs on the server to cause the server to communicate information to a Session Initiation Protocol (SIP) phone via an unsolicited NOTIFY message having a specific event header defined to signal the SIP phone to use a reset/restart procedure specific to the apparatus, the unsolicited NOTIFY message having a body that contains the information, the information including reset and restart information, the message also including a unique call ID for authenticating the unsolicited NOTIFY message, the unique call ID having been received from the SIP phone in a most recent REGISTER message, the information including version stamp information that causes the SIP phone to compare a version stamp received in the unsolicited NOTIFY message against a stored version stamp downloaded to the SIP phone during a last configuration file read; and
wherein the reset information causes the SIP phone to:
after waiting until all active calls on the SIP phone have ended, unregister all lines of the SIP phone from the call manager component;
perform a power-on reset of the SIP phone;
access a server to read the configuration file of the SIP phone;
re-register the lines of the SIP phone with the call manager component; and
verify that the call ID received matches a unique call ID sent to the call manager component in a last registering transmission.

* * * * *